(12) United States Patent
Haverinen et al.

(10) Patent No.: US 7,545,768 B2
(45) Date of Patent: Jun. 9, 2009

(54) UTILIZING GENERIC AUTHENTICATION ARCHITECTURE FOR MOBILE INTERNET PROTOCOL KEY DISTRIBUTION

(75) Inventors: Henry Haverinen, Jyväskylä (FI); Philip Ginzboorg, Espoo (FI)

(73) Assignee: Nokia Corporation, Espoo (FI)

( * ) Notice: Subject to any disclaimer, the term of this patent is extended or adjusted under 35 U.S.C. 154(b) by 713 days.

(21) Appl. No.: 11/179,607

(22) Filed: Jul. 13, 2005

(65) Prior Publication Data
US 2006/0251257 A1 Nov. 9, 2006

(30) Foreign Application Priority Data
Apr. 14, 2005 (FI) ................... 20050384

(51) Int. Cl.
*H04W 4/00* (2009.01)
(52) U.S. Cl. ................ 370/328; 370/338
(58) Field of Classification Search .............. None
See application file for complete search history.

(56) References Cited

U.S. PATENT DOCUMENTS

2002/0118674 A1 8/2002 Faccin et al.
2002/0120844 A1 8/2002 Faccin et al.
2003/0147537 A1 8/2003 Jing et al.
2005/0025091 A1* 2/2005 Patel et al. ............... 370/328
2006/0072759 A1* 4/2006 Gundavelli et al. ........ 380/270
2006/0104247 A1* 5/2006 Dommety et al. .......... 370/338
2007/0230453 A1* 10/2007 Giaretta et al. ............ 370/389

OTHER PUBLICATIONS

Franck Le, et al. (Nokia Research Center), "Key distribution mechanisms for Mobile IPv6", Aug. 23, 2001, pp. 1-14.

* cited by examiner

*Primary Examiner*—Bob A Phunkulh
(74) *Attorney, Agent, or Firm*—Squire, Sanders & Dempsey L.L.P.

(57) ABSTRACT

The invention allows utilizing Generic Authentication Architecture for Mobile Internet Protocol key distribution. A Generic Authentication Architecture bootstrapping is performed between a mobile terminal device and a Bootstrapping Server Function. In an embodiment a resulting Bootstrapping Transaction Identifier is sent to a Home Agent which uses it to obtain a Home Agent specific key to be used in authenticating a Mobile Internet Protocol Registration Request.

29 Claims, 2 Drawing Sheets

UTILIZING GENERIC AUTHENTICATION ARCHITECTURE FOR MOBILE INTERNET PROTOCOL KEY DISTRIBUTION

BACKGROUND OF THE INVENTION

1. Field of the Invention

The invention relates to telecommunications. In particular, the invention relates to a novel and improved method and system of utilizing Generic Authentication Architecture for Mobile Internet Protocol key distribution in a packet data network.

2. Description of the Related Art

In recent years mobile packet switched data communication networks have emerged alongside conventional fixed packet switched data communication networks. An example of a packet switched data communication network, or packet data network for short, that allows mobility is known as Wireless Local Area Network (WLAN or Wireless LAN). A Wireless LAN allows a mobile user to connect to a local area network (LAN) through a wireless connection. A standard, IEEE 802.11. specifies the technologies for Wireless LANs.

Mobile telecommunication networks have also started to support transmission of packet switched data or packet data in addition to traditional circuit switched data transmission. An example of a technique allowing packet data transmission for mobile communication networks is General Packet Radio Service (GPRS). GPRS is designed to support e.g. digital mobile telecommunication networks based on the Global System for Mobile Communications (GSM) standard. However, GPRS is not restricted to only GSM networks but supports also for example $3^{rd}$ Generation Partnership Project (3GPP) based digital mobile telecommunication networks, or 3GPP systems for short.

A current object on the field of telecommunications is to enable interworking between 3GPP systems and Wireless LANs so that e.g. resources and services within a 3GPP system may be accessed by Wireless LAN users and vice versa. As part of this object, service and session continuity needs to be provided, particularly during handover between a Wireless LAN and a 3GPP system. To enable the above service and session continuity, a protocol providing mobility is needed. One such protocol is Mobile Internet Protocol, or Mobile IP for short.

Mobile IP is an extension to Internet Protocol (IP) aimed to provide mobility support for IP. Using Mobile IP allows a terminal device to move from one link to another without changing its IP address (as seen by the layers above IP) and yet be reachable by other terminal devices. Mobile IP is being developed by IETF (Internet Engineering Task Force) and full specifications may be obtained e.g. from http://www.ietf.org.

The following describes briefly terminology related to Mobile IP and relevant to the rest of this document. The term 'node' refers to a device that implements IP. A router refers to a node that forwards IP packets not explicitly addressed to itself. A link refers to a communication facility or medium over which nodes can communicate at the Open Systems Interconnection (OSI) link layer. An interface refers to a node's attachment to a link. A subnet prefix refers to a bit string consisting of a number of initial bits of an IP address. A packet refers to an IP packet comprising one or more headers and payload. A header comprises one or more fields. A unit of data used to deliver information related to the protocols used is referred to as a message. Depending on its length a Mobile IP message may be transmitted in one IP packet or it may be divided in parts and the parts may be transmitted in separate IP packets. Furthermore, optional information may be carried in messages by using Extensions.

A Home Address refers to an IP address assigned to a Mobile Node and used as the permanent or semi-permanent address of the Mobile Node. A Home Subnet Prefix refers to the IP subnet prefix corresponding to a Mobile Node's Home Address. A Home Link refers to the link on which a Mobile Node's Home Subnet Prefix is defined. Any link other than a Mobile Node's Home Link is referred to as a Foreign Link. Any IP subnet prefix other than a Mobile Node's Home Subnet Prefix is referred to as a Foreign Subnet Prefix. A Mobile Node refers to a node that can change its point of attachment from one link to another, while still being reachable via its Home Address. Movement refers to a change in a Mobile Node's point of attachment to an IP network such that it is no longer connected to the same link as it was previously. If a Mobile Node is not currently attached to its Home Link, the Mobile Node is said to be 'away from home'.

A Correspondent Node refers to a peer node with which a Mobile Node is communicating. The Correspondent Node may itself be either mobile or stationary. A Care-of Address refers to an IP address associated with a Mobile Node while visiting a Foreign Link. The subnet prefix of this IP address is thus a Foreign Subnet Prefix. A Mobile Node may have multiple Care-Of Addresses at any given time but only one may be registered at the Home Agent. A Home Agent refers to a router on a Mobile Node's Home Link with which the Mobile Node has registered its current Care-Of Address.

Instead of its Home Address, a Mobile Node may use a Mobile Node Network Access Identifier Extension to identify itself, e.g. in case the Mobile Node is not configured with a Home Address. The Mobile Node Network Access Identifier Extension is an Extension containing a Network Access Identifier (NAI) of the Mobile Node. The Network Access Identifier is a commonly known identifier format, and it is described in more detail in 'Request for Comments'-document RFC2486 by The Internet Engineering Task Force (IETF).

Registration refers to a process in which a Mobile Node, being away from home, registers its Care-of Address with its Home Agent. Mobile IP Registration provides a flexible mechanism for a Mobile Node to communicate its current reachability information to its Home Agent. In addition to utilizing registration to inform its Home Agent of its current care-of address, a Mobile Node may utilize it to request forwarding services while away from home, to renew a registration due to expire, and to deregister when it returns home. Registration messages exchange information between a Mobile Node and its Home Agent. Registration creates or modifies a Mobility Binding at the Home Agent, associating the Mobile Node's Home Address with its Care-of Address for the specified Lifetime.

The Registration messages comprise a Registration Request-message and a Registration Reply-message. A Mobile Node registers with its Home Agent using the Registration Request-message so that its Home Agent can create or modify a Mobility Binding for that Mobile Node. In response to the Registration Request-message, the Home Agent returns a Registration Reply-message to the Mobile Node. The Registration Reply-message contains the necessary codes to inform the Mobile Node about the status of its Registration Request, along with the lifetime of the Registration granted by the Home Agent.

The term 'Mobility Security Association' refers to a collection of security contexts, between a pair of nodes, which may be applied to Mobile IP protocol messages exchanged between them. Each security context indicates an authentication algorithm and mode, a secret (such as a shared key, or an appropriate public/private key pair), and a style of replay protection in use. The term 'Security Parameter Index' (SPI) refers to an index which identifies a security context between a pair of nodes among the contexts available in the Mobility Security Association. Thus each Mobile Node and Home Agent needs to support a Mobility Security Association, indexed by their SPI and IP address. In the case of the Mobile Node, the IP address is typically its Home Address. Registration messages between a Mobile Node and its Home Agent are authenticated, typically with an authorization-enabling Extension.

As is obvious from the above description, Mobile IP requires the following subscriber-specific parameters to be provisioned to a Mobile Node: a Mobile Node Network Access Identifier (or a Home Address), a symmetric key which is shared by the Mobile Node and its Home Agent, and a Security Parameter Index identifying a security association of the Mobile Node. In other words, Mobile IP requires a key distribution mechanism.

Therefore, in order to utilize Mobile IP for providing mobility in order to enable the above service and session continuity between 3GPP systems and Wireless LANs, a key distribution mechanism for Mobile IP is needed.

Recently a general authentication and key distribution solution called Generic Authentication Architecture (GAA) has been developed for 3GPP systems. The Generic Authentication Architecture (GAA) includes Generic Bootstrapping Architecture (GBA). By using the GBA part of the Generic Authentication Architecture a shared symmetric key, identified with a Bootstrapping Transaction Identifier (B-TID), can be agreed on between a mobile terminal device and the network based on Universal Subscriber Identity Module (USIM) authentication.

The GBA part of the Generic Authentication Architecture is described in more detail in 3GPP Technical Specification 33.220. However, the following describes briefly terminology related to Generic Authentication Architecture and relevant to the rest of this document.

The term 'Network Application Function' refers to an application hosted in a network element. A Bootstrapping Server Function (BSF) is hosted in a network element, typically under the control of a network operator. A Bootstrapping Server Function and a terminal device participate in a Bootstrapping Procedure in which a shared secret is established between the network and the terminal device. Subsequently, the shared secret can be used between Network Application Functions and terminal devices, for example, for authentication purposes. Generic Bootstrapping Architecture may be used between Network Application Functions and terminal devices for authentication purposes, and for securing a communication path between a terminal device and a Network Application Function. The Bootstrapping Transaction Identifier is used to bind a subscriber identity to a corresponding key.

The Bootstrapping Procedure is performed between a Bootstrapping Server Function and a terminal device. In an embodiment of the Bootstrapping Procedure, the terminal device first sends a request comprising a user identity to the Bootstrapping Server Function. In response, the Bootstrapping Server Function retrieves user security settings and an Authentication Vector including a Random challenge (RAND), an Authentication Token (AUTN), an Expected Response (XRES), a Cipher Key (CK), and an Integrity Key (IK) from the network.

Then the Bootstrapping Server Function forwards the Random challenge and Authentication Token to the terminal device. The terminal device checks the Authentication Token to verify that the challenge is from an authorized network. The terminal device also calculates the Cipher Key, the Integrity Key and a Response (RES). As a result, both the terminal device and the Bootstrapping Server Function end up with session keys: the Cipher Key and the Integrity Key. Next, the terminal device sends another request, containing a Digest Authentication and Key Agreement (AKA) response to the Bootstrapping Server Function. The Bootstrapping Server Function authenticates the terminal device by verifying the Digest AKA response.

Next, the Bootstrapping Server Function generates a shared key (Ks) by concatenating the Cipher Key and the Integrity Key. The Bootstrapping Transaction Identifier is also generated, e.g. in Network Access Identifier format by taking a base64 encoded Random challenge value from above and the server name of the Bootstrapping Server Function, i.e. base64encode(RAND)@BSF_servers_domain_name. The Bootstrapping Server Function sends a message, including the Bootstrapping Transaction Identifier and the lifetime of the shared key Ks, to the terminal device to indicate the success of the authentication. The terminal device generates the key Ks by concatenating the Cipher Key and the Integrity Key.

Subsequently, both the terminal device and the Bootstrapping Server Function will use the shared key Ks to derive a Network Application Function-specific key (Ks_NAF) to be used between a Network Application Function and the terminal device, for example, for authentication purposes. The Network Application Function-specific key Ks_NAF may be derived e.g. as Ks_NAF=KDF(Ks, "gba-me", RAND, IMPI, NAF_Id), in which KDF is a key derivation function, and the key derivation parameters comprise the user's private identity (IMPI), an identification of the Network Application Function (NAF_Id) and a Random challenge (RAND). The NAF_Id comprises a Domain Name Server name of the Network Application Function. The string "gba-me" specifies the purpose for which the KDF is used.

However, even though the above described Generic Authentication Architecture does provide a generic key distribution solution, it cannot be used with Mobile IP as such. This is because, as described above, Mobile IP requires a Mobile Node Network Access Identifier (or a Home Address), a symmetric key shared by a Mobile Node and its Home Agent, and a Security Parameter Index identifying a security association of the Mobile Node to be provisioned to the Mobile Node. Yet, as also described above, at present Generic Authentication Architecture can only be used to provision a key and a Bootstrapping Transaction Identifier.

There are some prior art solutions for providing key distribution for Mobile IP, such as utilization of 3GPP RADIUS protocol, and various device management-related solutions. Yet, use of Generic Authentication Architecture would have significant advantages over prior art solutions. For example, use of Generic Authentication Architecture would allow Universal Subscriber Identity Module (USIM) authentication and Subscriber Identity Module (SIM) authentication for Mobile IP. Furthermore, use of Generic Authentication Architecture would require no changes in the Mobile IP protocol specifications, and little, if any, changes in implementations.

Therefore, the object of the present invention is to alleviate the problems described above and to introduce a mechanism that allows utilizing Generic Authentication Architecture for Mobile Internet Protocol key distribution in a packet data network.

SUMMARY OF THE INVENTION

A first aspect of the present invention is a method of utilizing Generic Authentication Architecture for Mobile Internet Protocol key distribution in a packet data network comprising a mobile terminal device, a Bootstrapping Server Function, a Network Application Function, and a Home Agent associated with the mobile terminal device.

It is to be understood that in the context of the present invention the term 'mobile terminal device' refers to a device implementing both Generic Authentication Architecture and Mobile Internet Protocol so that from the viewpoint of Mobile Internet Protocol the 'mobile terminal device' acts as a Mobile Node, and from the viewpoint of Generic Authentication Architecture the 'mobile terminal device' acts as a terminal device, or User Equipment, capable of performing a Generic Authentication Architecture bootstrapping procedure with the Bootstrapping Server Function, and capable of deriving Network Application Function-specific keys on the basis of shared keys acquired as a result of the Generic Authentication Architecture bootstrapping procedure, as described above.

Furthermore, it is to be understood that in the context of the present invention the term 'Bootstrapping Server Function' refers to a network entity implementing the above described Bootstrapping Server Function -functionality of Generic Authentication Architecture. The network entity may implement other functionalities as well.

Furthermore, it is to be understood that in the context of the present invention the term 'Home Agent' refers to a network entity implementing the above described Home Agent -functionality of Mobile Internet Protocol. Furthermore, it is to be understood that in the context of the present invention the term 'Network Application Function' refers to an application hosted in a network element.

In accordance with the method of the present invention, the Generic Authentication Architecture bootstrapping procedure is performed between the mobile terminal device and the Bootstrapping Server Function. As a result, the mobile terminal device and the Bootstrapping Server Function each acquire at least a Bootstrapping Transaction Identifier associated with the mobile terminal device and a corresponding shared key.

It is to be understood that in the context of the present invention the term 'shared key' refers to the above described shared key Ks of Generic Authentication Architecture. Furthermore, it is to be understood that in the context of the present invention the term 'Bootstrapping Transaction Identifier' refers to the above described Bootstrapping Transaction Identifier of Generic Authentication Architecture. Furthermore, it is to be understood that in the context of the present invention the term 'shared' refers to the key being shared by the mobile terminal device and the Bootstrapping Server Function.

Further in accordance with the method of the present invention, a Network Application Function specific key is derived with the mobile terminal device on the basis of at least the acquired shared key and an identifier of the Network Application Function.

It is to be understood that in the context of the present invention the term 'Network Application Function specific key' refers to the above described Network Application Function-specific key Ks_NAF of Generic Authentication Architecture. In the art, the above described Network Application Function-specific key Ks_NAF is sometimes also referred to as Ks_int_NAF or Ks_ext_NAF. In accordance with the invention, the Network Application Function-specific key (Ks_NAF, Ks_int_NAF or Ks_ext_NAF) has been derived by using the identifier of the Network Application Function as the identification of the Network Application Function NAF_Id.

Further in accordance with the method of the present invention, a message authentication code is derived with the mobile terminal device on the basis of at least the derived Network Application Function specific key.

Further in accordance with the method of the present invention, a request message for Mobile Internet Protocol registration is sent from the mobile terminal device to the Home Agent. The request message for Mobile Internet Protocol registration comprises the derived message authentication code and an identifier of the mobile terminal device. The message authentication code may be comprised e.g. in an authentication extension of the request message, such as a 'Mobile-Home Authentication Extension' or a 'Mobile Node-AAA Authentication Extension'. The message authentication code may be derived as specified in Mobile Internet Protocol, i.e. the message authentication code may be computed over the contents of the request message (excluding the authentication extension) so that the resulting message authentication code is a "message digest" of the specific request message which it authenticates. For example HMAC-MD5 algorithm may be used for computing the message authentication code.

Further in accordance with the method of the present invention, the Network Application Function specific key is obtained with the Home Agent from one of: the Bootstrapping Server Function and the Network Application Function. The Network Application Function specific key is obtained on the basis of the received identifier of the mobile terminal device. In an embodiment, an identifier of the Network Application Function may also be utilized in obtaining the Network Application Function specific key. That is, the received identifier of the mobile terminal device is utilized to find the corresponding shared key from one of: the Bootstrapping Server Function and the Network Application Function; and the found shared key and optionally the identifier of the Network Application Function are utilized to derive the Network Application Function specific key.

Further in accordance with the method of the present invention, the received request message for Mobile Internet Protocol registration is authenticated with the Home Agent by verifying the received message authentication code with the obtained Network Application Function specific key.

A second aspect of the present invention is a system of utilizing Generic Authentication Architecture for Mobile Internet Protocol key distribution in a packet data network comprising a mobile terminal device, a Bootstrapping Server Function, a Network Application Function, and a Home Agent associated with the mobile terminal device.

The system in accordance with the second aspect of the present invention comprises a first bootstrapper and a second bootstrapper disposed respectively in the mobile terminal device and the Bootstrapping Server Function, and arranged to perform a Generic Authentication Architecture bootstrapping procedure between the mobile terminal device and the Bootstrapping Server Function resulting in the mobile terminal device and the Bootstrapping Server Function each acquiring at least a Bootstrapping Transaction Identifier associated with the mobile terminal device and a corresponding shared key.

The system in accordance with the second aspect of the present invention further comprises a Network Application Function specific key deriver disposed in the mobile terminal device and arranged to derive a Network Application Function specific key on the basis of at least the acquired shared key and an identifier of the Network Application Function.

The system in accordance with the second aspect of the present invention further comprises a message authentication code deriver disposed in the mobile terminal device and arranged to derive a message authentication code on the basis of at least the derived Network Application Function specific key.

The system in accordance with the second aspect of the present invention further comprises a registration requester disposed in the mobile terminal device and arranged to send to the Home Agent a request message for Mobile Internet Protocol registration comprising the derived message authentication code and an identifier of the mobile terminal device.

The system in accordance with the second aspect of the present invention further comprises a Network Application Function specific key obtainer disposed in the Home Agent and arranged to obtain, on the basis of the received identifier of the mobile terminal device, the Network Application Function specific key from one of: the Bootstrapping Server Function and the Network Application Function.

The system in accordance with the second aspect of the present invention further comprises a registration authenticator disposed in the Home Agent and arranged to authenticate the received request message for Mobile Internet Protocol registration by verifying the received message authentication code with the Network Application Function specific key.

A third aspect of the present invention is a system of utilizing Generic Authentication Architecture for Mobile Internet Protocol key distribution in a packet data network comprising a mobile terminal device, a Bootstrapping Server Function, a Network Application Function, and a Home Agent associated with the mobile terminal device.

The system in accordance with the third aspect of the present invention comprises a first bootstrapping means and a second bootstrapping means, disposed respectively in the mobile terminal device and the Bootstrapping Server Function, for performing a Generic Authentication Architecture bootstrapping procedure between the mobile terminal device and the Bootstrapping Server Function resulting in the mobile terminal device and the Bootstrapping Server Function each acquiring at least a Bootstrapping Transaction Identifier associated with the mobile terminal device and a corresponding shared key.

The system in accordance with the third aspect of the present invention further comprises a Network Application Function specific key deriving means, disposed in the mobile terminal device, for deriving a Network Application Function specific key on the basis of at least the acquired shared key and an identifier of the Network Application Function.

The system in accordance with the third aspect of the present invention further comprises a message authentication code deriving means, disposed in the mobile terminal device, for deriving a message authentication code on the basis of at least the derived Network Application Function specific key.

The system in accordance with the third aspect of the present invention further comprises a registration requesting means, disposed in the mobile terminal device, for sending to the Home Agent a request message for Mobile Internet Protocol registration comprising the derived message authentication code and an identifier of the mobile terminal device.

The system in accordance with the third aspect of the present invention further comprises a Network Application Function specific key obtaining means, disposed in the Home Agent, for obtaining, on the basis of the received identifier of the mobile terminal device, the Network Application Function specific key from one of: the Bootstrapping Server Function and the Network Application Function.

The system in accordance with the third aspect of the present invention further comprises a registration authenticating means, disposed in the Home Agent, for authenticating the received request message for Mobile Internet Protocol registration by verifying the received message authentication code with the Network Application Function specific key.

A fourth aspect of the present invention is a mobile terminal device of a packet data network. The mobile terminal device in accordance with the fourth aspect of the present invention comprises a first bootstrapper arranged to perform a Generic Authentication Architecture bootstrapping procedure with a Bootstrapping Server Function of the packet data network resulting in the mobile terminal device and the Bootstrapping Server Function each acquiring at least a Bootstrapping Transaction Identifier associated with the mobile terminal device and a corresponding shared key.

The mobile terminal device in accordance with the fourth aspect of the present invention further comprises a Network Application Function specific key deriver arranged to derive a Network Application Function specific key on the basis of at least the acquired shared key and an identifier of a Network Application Function of the packet data network.

The mobile terminal device in accordance with the fourth aspect of the present invention further comprises a message authentication code deriver arranged to derive a message authentication code on the basis of at least the derived Network Application Function specific key.

The mobile terminal device in accordance with the fourth aspect of the present invention further comprises a registration requester arranged to send to a Home Agent associated with the mobile terminal device a request message for Mobile Internet Protocol registration comprising the derived message authentication code and an identifier of the mobile terminal device.

A fifth aspect of the present invention is a Home Agent of a packet data network. The Home Agent in accordance with the fifth aspect of the present invention comprises a Network Application Function specific key obtainer arranged to obtain, on the basis of an identifier of a mobile terminal device of the packet data network, a Network Application Function specific key from one of: a Bootstrapping Server Function of the packet data network and the Network Application Function; which identifier of the mobile terminal device is received from the mobile terminal device.

The Home Agent in accordance with the fifth aspect of the present invention further comprises a registration authenticator arranged to authenticate a request message for Mobile Internet Protocol registration by verifying a message authentication code with the obtained Network Application Function specific key, the request message and the message authentication code received from the mobile terminal device.

A sixth aspect of the present invention is a computer program embodied on a computer readable medium for utilizing Generic Authentication Architecture for Mobile Internet Protocol key distribution in a packet data network comprising a mobile terminal device, a Bootstrapping Server Function, a Network Application Function, and a Home Agent associated with the mobile terminal device. The computer program controls a data-processing device to perform the steps of:

performing a Generic Authentication Architecture bootstrapping procedure between the mobile terminal device and the Bootstrapping Server Function resulting in the mobile terminal device and the Bootstrapping Server Function each acquiring at least a Bootstrapping Transaction Identifier associated with the mobile terminal device and a corresponding shared key;

deriving with the mobile terminal device a Network Application Function specific key on the basis of at least the acquired shared key and an identifier of the Network Application Function;

deriving with the mobile terminal device a message authentication code on the basis of at least the derived Network Application Function specific key;

sending from the mobile terminal device to the Home Agent a request message for Mobile Internet Protocol registration comprising the derived message authentication code and an identifier of the mobile terminal device;

obtaining, on the basis of the received identifier of the mobile terminal device, the Network Application Function specific key with the Home Agent from one of: the Bootstrapping Server Function and the Network Application Function; and authenticating the received request message for Mobile Internet Protocol registration with the Home Agent by verifying the received message authentication code with the obtained Network Application Function specific key.

In an embodiment of the invention, an acknowledgement message is sent, in response to successful authentication, to the mobile terminal device to indicate successful Mobile Internet Protocol registration.

In an embodiment of the invention, a subsequent request message for Mobile Internet Protocol registration received from the mobile terminal device to the Home Agent is authenticated by utilizing the already obtained Network Application Function specific key.

In an embodiment of the invention, the identifier of the mobile terminal device comprises the Bootstrapping Transaction Identifier.

In an embodiment of the invention, the identifier of the mobile terminal device comprises a Network Access Identifier of the mobile terminal device.

In an embodiment of the invention, the identifier of the Network Application Function comprises a Domain Name Server name of the Network Application Function.

In an embodiment of the invention, the identifier of the Network Application Function comprises an Internet Protocol address of the Network Application Function.

In an embodiment of the invention, the Network Application Function is associated with the Home Agent, and the identifier of the Network Application Function comprises a Domain Name Server name of the Home Agent.

In an embodiment of the invention, the Network Application Function is associated with the Home Agent, and the identifier of the Network Application Function comprises an Internet Protocol address of the Home Agent.

In an embodiment of the invention, the Network Application Function is associated with a group of Home Agents including the above Home Agent, and the identifier of the Network Application Function comprises a Domain Name Server name of the Network Application Function.

In an embodiment of the invention, the Network Application Function is associated with a group of Home Agents including the above Home Agent, and the identifier of the Network Application Function comprises an Internet Protocol address of the Network Application Function.

In an embodiment of the invention, the Network Application Function specific key obtainer is further arranged to send a request for the Network Application Function specific key to the Network Application Function which request comprises the received identifier of the mobile terminal device and the identifier of the Network Application Function. In this embodiment, the Network Application Function is further arranged to forward the request to the Bootstrapping Server Function. In this embodiment, the Bootstrapping Server Function is further arranged to derive, in response to the received request, the Network Application Function specific key on the basis of at least the received identifier of the Network Application Function and a shared key corresponding to the received identifier of the mobile terminal device. In this embodiment, the Bootstrapping Server Function is further arranged to forward the derived Network Application Function specific key to the Home Agent.

In an embodiment of the invention, the request message for Mobile Internet Protocol registration is a 'Registration Request'-message of Mobile Internet Protocol version 4. described in more detail above. The 'Registration Request'-message may comprise a Mobile Node Network Access Identifier Extension which may comprise the identifier of the mobile terminal device, i.e. the Network Access Identifier of the mobile terminal device, or, in accordance with the invention, the Bootstrapping Transaction Identifier.

In an embodiment of the invention, the acknowledgement message is a 'Registration Reply-message of Mobile Internet Protocol version 4. described in more detail above.

In an embodiment of the invention, the request message for Mobile Internet Protocol registration is a 'Binding Update'-message of Mobile Internet Protocol version 6.

In an embodiment of the invention, the acknowledgement message is a 'Binding Acknowledgement-message of Mobile Internet Protocol version 6.

In an embodiment of the invention, if a request message for Mobile Internet Protocol registration is sent to the Home Agent from the mobile terminal device without the mobile terminal device performing the bootstrapping procedure first, a message indicating that bootstrapping is needed is sent to the mobile terminal device from the Home Agent.

The invention allows utilizing Generic Authentication Architecture for Mobile Internet Protocol key distribution in a packet data network. Use of Generic Authentication Architecture in accordance with the invention allows Universal Subscriber Identity Module authentication and Subscriber Identity Module authentication for Mobile IP. Furthermore, use of Generic Authentication Architecture in accordance with the invention require no changes in the Mobile IP protocol specifications, and little, if any, changes in implementations.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
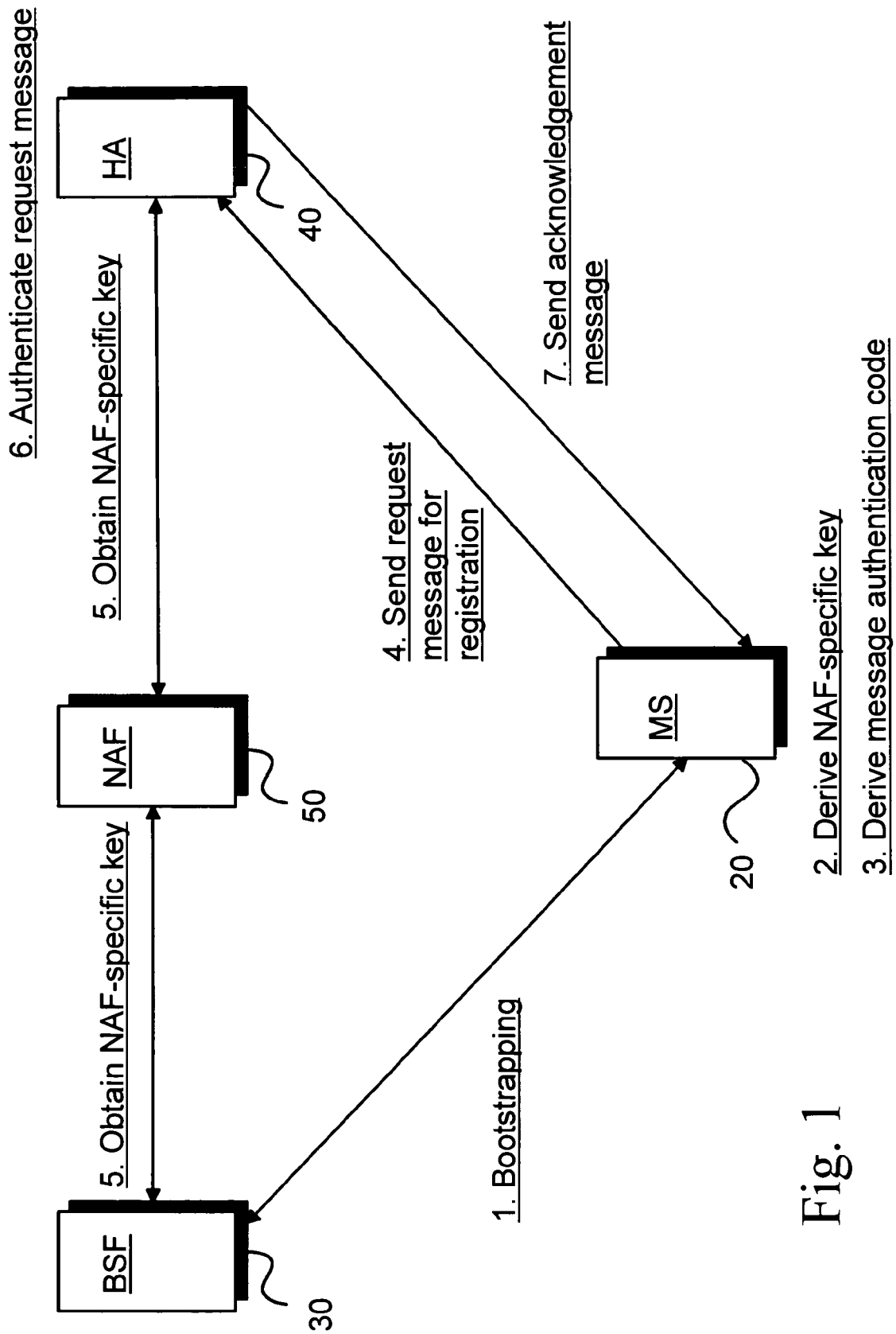
FIG. 1 is a diagram illustrating a method according to an embodiment of the present invention.

FIG. 1 illustrates an embodiment of the method of the present invention relating to utilizing Generic Authentication Architecture for Mobile Internet Protocol key distribution in a packet data network. The packet data network comprises a mobile terminal device 20, a Bootstrapping Server Function 30, a Home Agent 40 associated with the mobile terminal device 20, and Network Application Function 50.

Even though FIG. 1 illustrates the Network Application Function 50 and the Home Agent 40 as separate, the Network Application Function 50 may, in an embodiment of the invention, be integrated with the Home Agent 40. In this embodiment, an identifier of the Network Application Function 50 may comprise e.g. a Domain Name Server name of the Home Agent 40. Alternatively, in this embodiment, the identifier of the Network Application Function 50 may comprise e.g. an Internet Protocol address of the Home Agent 40.

In another embodiment of the invention, the Network Application Function 50 and the Home Agent 40 may be separate network entities. In this embodiment, the identifier of the Network Application Function 50 may comprise e.g. a Domain Name Server name or an Internet Protocol address of the Network Application Function 50.

In yet another embodiment of the invention, the Network Application Function 50 may be associated with a group of Home Agents including the Home Agent 40. In this embodiment, the identifier of the Network Application Function 50 may comprise e.g. a Domain Name Server name or an Internet Protocol address of the Network Application Function 50.

In the embodiment of the invention illustrated in FIG. 1, a Generic Authentication Architecture bootstrapping procedure is performed between the mobile terminal device 20 and the Bootstrapping Server Function 30, step 1. As a result, the mobile terminal device 20 and the Bootstrapping Server Function 30 each acquire at least a Bootstrapping Transaction Identifier associated with the mobile terminal device 20 and a corresponding shared key. In an embodiment of the present invention, the mobile terminal device 20 and the Bootstrapping Server Function 30 may each further acquire a lifetime of the shared key.

Next, at step 2, a key specific to Network Application Function is derived with the mobile terminal device 20 on the basis of at least the shared key, acquired at step 1, and the identifier of the Network Application Function 50. At step 3, a message authentication code is derived with the mobile terminal device 20 on the basis of at least the derived Network Application Function specific key. A request message for Mobile Internet Protocol registration is sent from the mobile terminal device 20 to the Home Agent 40, step 4. The request message for Mobile Internet Protocol registration comprises the derived message authentication code and an identifier of the mobile terminal device 20.

In an embodiment of the invention, the identifier of the mobile terminal device 20 may comprise the Bootstrapping Transaction Identifier acquired at step 1. In another embodiment of the invention, the identifier of the mobile terminal device 20 may comprise a Network Access Identifier of the mobile terminal device 20. In yet another embodiment of the invention, the identifier of the mobile terminal device 20 may comprise a Network Access Identifier of the mobile terminal device 20, Network Access Identifier comprising the Bootstrapping Transaction Identifier acquired at step 1.

In an embodiment of the invention, the request message for Mobile Internet Protocol registration may be e.g. a 'Registration Request'-message of Mobile Internet Protocol version 4. In this embodiment, the identifier of the mobile terminal device 20 may be comprised e.g. in a Mobile Node Network Access Identifier Extension of the 'Registration Request'-message.

In an embodiment of the invention, the request message for Mobile Internet Protocol registration may be e.g. a 'Binding Update'-message of Mobile Internet Protocol version 6. In this embodiment, the identifier of the mobile terminal device 20 may be comprised e.g. in an option of the 'Binding Update'-message.

In the above embodiment of the identifier of the mobile terminal device 20 comprising the Bootstrapping Transaction Identifier, there is no need to provision Security Parameter Index values to mobile terminal devices due to the Bootstrapping Transaction Identifier already uniquely identifying the shared key. In an embodiment, the mobile terminal device 20 may use a well-known, i.e. fixed, Security Parameter Index e.g. in a Security Parameter Index field of a Mobile Internet Protocol Authenticator Extension. In an embodiment, the well-known Security Parameter Index value may be allocated by Internet Assigned Name Authority (IANA) for this purpose. In another embodiment, the well-known Security Parameter Index value may be chosen from a dynamic Security Parameter Index range by the 3GPP system.

In the above embodiment of the identifier of the mobile terminal device 20 comprising the Network Access Identifier of the mobile terminal device 20, the Network Access Identifier may comprise an International Mobile Subscriber Identity (IMSI) of the subscriber. As is known in the art, a Network Access Identifier might not uniquely identify the shared key because the Network Access Identifier can be a long-term identifier that does not change upon bootstrapping. Therefore, in this embodiment, a well-known Security Parameter Index may be used, and consequently the most recently bootstrapped shared key would be used.

At step 5, the Network Application Function specific key is obtained with the Home Agent 40 from one of: the Bootstrapping Server Function 30 and the Network Application Function 50. The Network Application Function specific key is obtained on the basis of the received identifier of the mobile terminal device 20.

At step 6, the received request message for Mobile Internet Protocol registration is authenticated with the Home Agent 40 by verifying the received message authentication code with the obtained Network Application Function specific key. At step 7, an acknowledgement message is sent, in response to successful authentication, to the mobile terminal device 20 to indicate successful Mobile Internet Protocol registration.

The invention allows authenticating a subsequent Mobile Internet Protocol registration received from the mobile terminal device 20 to the Home Agent 40 by utilizing the Network Application Function specific key already obtained at step 5. When the already obtained Network Application Function specific key is about to expire, the mobile terminal device 20 may e.g. perform the Generic Authentication Architecture bootstrapping procedure of step 1 again in order to acquire a new Bootstrapping Transaction Identifier for future Mobile Internet Protocol registrations.

Figure 2:
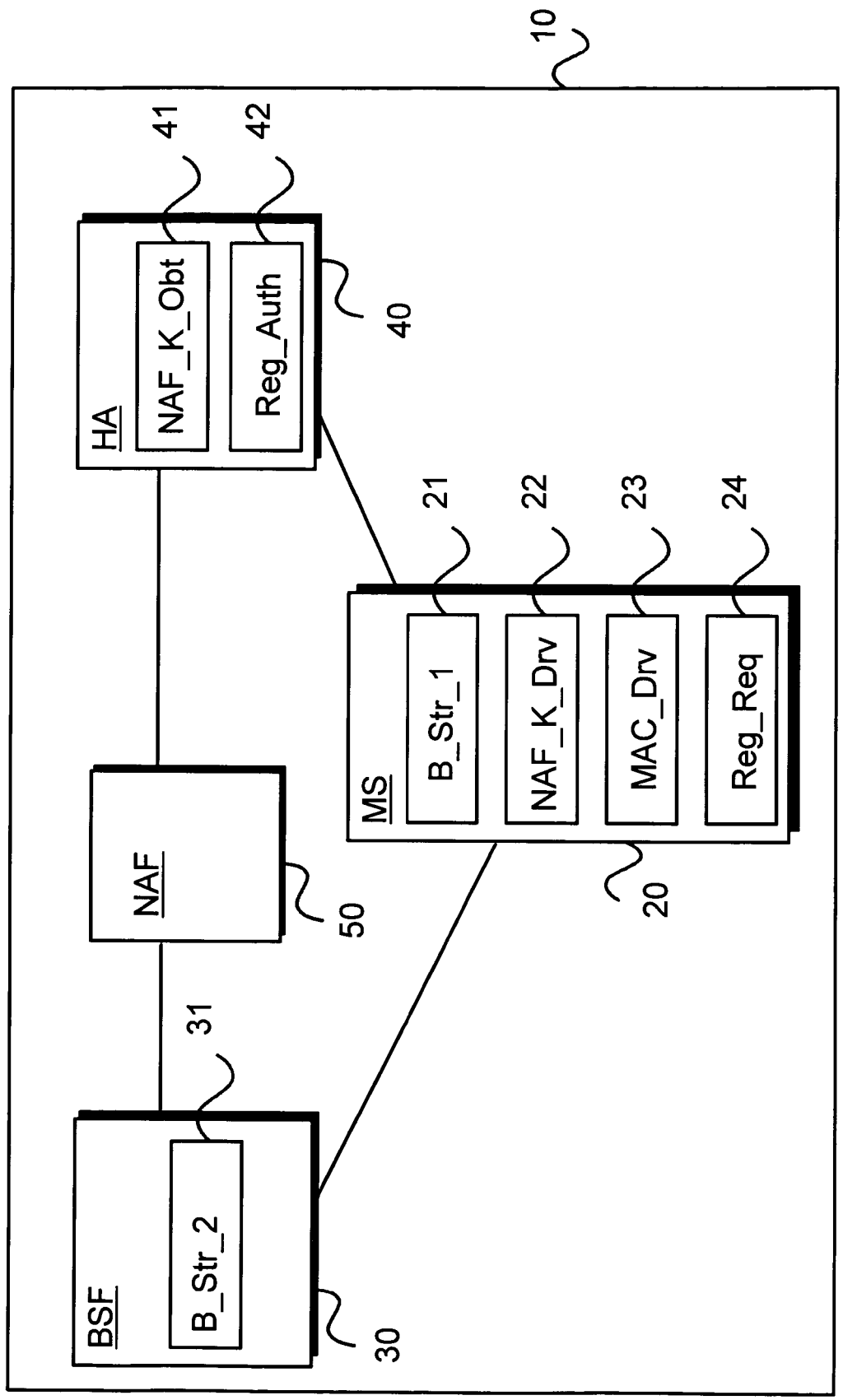
FIG. 2 is a block diagram illustrating a system according to an embodiment of the present invention.

FIG. 2 illustrates an embodiment of the system of the present invention. A packet data network 10 comprising a mobile terminal device 20, a Bootstrapping Server Function 30, a Network Application Function 50, and a Home Agent 40 associated with the mobile terminal device 20 are disclosed in FIG. 2.

The embodiment of the system of the present invention illustrated in FIG. 2 comprises a first bootstrapper 21 and a second bootstrapper 31 disposed respectively in the mobile terminal device 20 and the Bootstrapping Server Function 30, and arranged to perform a Generic Authentication Architecture bootstrapping procedure between the mobile terminal device 20 and the Bootstrapping Server Function 30 resulting in the mobile terminal device 20 and the Bootstrapping Server Function 30 each acquiring at least a Bootstrapping Transaction Identifier associated with the mobile terminal device 20 and a corresponding shared key.

The embodiment of the system of the present invention illustrated in FIG. 2 further comprises a Network Application Function specific key deriver 22 disposed in the mobile terminal device 20 and arranged to derive a Network Application Function specific key on the basis of at least the acquired shared key and an identifier of the Network Application Function 50.

The embodiment of the system of the present invention illustrated in FIG. 2 further comprises a message authentication code deriver 23 disposed in the mobile terminal device 20 and arranged to derive a message authentication code on the basis of at least the derived Network Application Function specific key.

The embodiment of the system of the present invention illustrated in FIG. 2 further comprises a registration requester 24 disposed in the mobile terminal device 20 and arranged to send to the Home Agent 40 a request message for Mobile Internet Protocol registration comprising the derived message authentication code and an identifier of the mobile terminal device 20.

The embodiment of the system of the present invention illustrated in FIG. 2 further comprises a Network Application Function specific key obtainer 41 disposed in the Home Agent 40 and arranged to obtain, on the basis of the received identifier of the mobile terminal device 20 and optionally the identifier of the Network Application Function 50, the Network Application Function specific key from one of: the Bootstrapping Server Function 30 and the Network Application Function 50.

The embodiment of the system of the present invention illustrated in FIG. 2 further comprises a registration authenticator 42 disposed in the Home Agent 40 and arranged to authenticate the received request message for Mobile Internet Protocol registration by verifying the received message authentication code with the Network Application Function specific key.

In an embodiment of the invention, the Network Application Function specific key obtainer 41 may be further arranged to send a request for the Network Application Function specific key to the Network Application Function 50 which request comprises the received identifier of the mobile terminal device 20 and the identifier of the Network Application Function 50. In this embodiment, the Network Application Function 50 may be arranged to forward the request to the Bootstrapping Server Function 30. In this embodiment, the Bootstrapping Server Function 30 may be further arranged to derive, in response to the received request, the Network Application Function specific key on the basis of at least the received identifier of the Network Application Function 50 and a shared key corresponding to the received identifier of the mobile terminal device 20. In this embodiment, the Bootstrapping Server Function 30 may be further arranged to forward the derived Network Application Function specific key to the Home Agent 40.

In an embodiment of the invention, the Network Application Function 50 or the Bootstrapping Server Function 30 may comprise a database (not illustrated in FIG. 2) accessible via e.g. Lightweight Directory Access Protocol (LDAP). In an embodiment of the invention, the Network Application Function 50 or the Bootstrapping Server Function 30 may comprise a database server (not illustrated in FIG. 2) accessible via e.g. RADIUS protocol. The request for the Network Application Function specific key sent from the Network Application Function specific key obtainer 41 may be directed to this database or database server which may then contact the Bootstrapping Server Function 30 to acquire the Network Application Function specific key. Alternatively, the database or database server may store one or more previously acquired Network Application Function specific keys which it may have previously acquired from the Bootstrapping Server Function 30.

Alternative to utilizing the identifier of the Network Application Function 50 in obtaining the Network Application Function specific key, as described above, pre-configured server information may be utilized in obtaining the Network Application Function specific key, which pre-configured server information relates to the above described database or database server.

In an embodiment of the invention, if the mobile terminal device 20 attempts to register with the Home Agent 40 without bootstrapping first, the Home Agent 40 may be arranged to send a message to the mobile terminal device 20 indicating that bootstrapping is needed.

The above first bootstrapper 21, Network Application Function specific key deriver 22, message authentication code deriver 23, registration requester 24, second bootstrapper 31, Network Application Function specific key obtainer 41, and registration authenticator 42 may be implemented in software, in hardware, or in combination of software and hardware.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:

performing a generic authentication architecture bootstrapping procedure between a mobile terminal device and a bootstrapping server function resulting in said mobile terminal device and said bootstrapping server function each acquiring at least a bootstrapping transaction identifier associated with said mobile terminal device and a corresponding shared key;

deriving with said mobile terminal device a network application function specific key based on at least said acquired shared key and an identifier of network application function;

deriving with said mobile terminal device a message authentication code based on at least said derived network application function specific key;

sending from said mobile terminal device to a home agent a request message for mobile internet protocol registration comprising said derived message authentication code and an identifier of said mobile terminal device;

obtaining, based on said received identifier of said mobile terminal device, said network application function specific key with said home agent from one of said bootstrapping server function and said network application function; and authenticating said request message for mobile internet protocol registration with said home agent by verifying said message authentication code with said obtained network application function specific key.

2. The method according to claim 1, further comprising:
sending, in response to successful authentication, an acknowledgement message to said mobile terminal device to indicate successful mobile internet protocol registration.

3. The method according to claim 1, wherein a subsequent request message for mobile internet protocol registration received from said mobile terminal device at said home agent is authenticated by utilizing said obtained network application function specific key.

4. The method according to claim 1, wherein said identifier of said mobile terminal device comprises said bootstrapping transaction identifier.

5. The method according to claim 1, wherein said identifier of said mobile terminal device comprises a network access identifier of said mobile terminal device.

6. The method according to claim 1, wherein said identifier of said network application function comprises a domain name server name of said network application function.

7. The method according to claim 1, wherein said identifier of said network application function comprises an internet protocol address of said network application function.

8. The method according to claim 1, wherein said network application function is associated with said home agent, and wherein said identifier of said network application function comprises a domain name server name of said home agent.

9. The method according to claim 1, wherein said network application function is associated with said home agent, and wherein said identifier of said network application function comprises an internet protocol address of said home agent.

10. The method according to claim 1, wherein said network application function is associated with a group of home agents including said home agent, and wherein said identifier of said network application function comprises a domain name server name of said network application function.

11. The method according to claim 1, wherein said network application function is associated with a group of home agents including said home agent, and wherein said identifier of said network application function comprises an internet protocol address of said network application function.

12. The method according to claim 1, wherein, if a request message for mobile internet protocol registration is sent to said home agent from said mobile terminal device without said mobile terminal device performing said bootstrapping procedure first, a message indicating that bootstrapping is needed is sent to said mobile terminal device from said home agent.

13. An apparatus, comprising:
a first bootstrapper configured to perform a generic authentication architecture bootstrapping procedure with a bootstrapping server function of a packet data network resulting in a device and said bootstrapping server function each acquiring at least a bootstrapping transaction identifier associated with said mobile terminal device and a corresponding shared key;
a network application function specific key deriver configured to derive a network application function specific key based on at least said acquired shared key and an identifier of a network application function of said packet data network;
a message authentication code deriver configured to derive a message authentication code based on at least said derived network application function specific key; and
a registration requester configured to send to a home agent associated with said mobile terminal device a request message for mobile internet protocol registration comprising said derived message authentication code and an identifier of said mobile terminal device.

14. The apparatus according to claim 13, further comprising:
a receiver configured to receive an acknowledgement message to indicate successful mobile internet protocol registration.

15. The apparatus according to claim 13, wherein
said registration requester is further configured to transmit a subsequent request message for mobile internet protocol registration to be authenticated.

16. The apparatus according to claim 14, wherein
said receiver is further configured to receive a message indicating that bootstrapping is needed if a request message for mobile internet protocol registration is transmitted from said device without performing said bootstrapping first.

17. An apparatus, comprising:
a network application function specific key obtainer configured to obtain, based on an identifier of a mobile terminal device of a packet data network, a network application function specific key from one of a bootstrapping server function of a packet data network and said network application function; said identifier of said mobile terminal device received from said mobile terminal device; and
a registration authenticator configured to authenticate a request message for mobile internet protocol registration by verifying a message authentication code with said obtained network application function specific key, said request message and said message authentication code received from said mobile terminal device, said received message authentication code having been derived based on another copy of said network application function specific key, and said another copy of said network application function specific key having been derived based on at least an identifier of said network application function and a shared key corresponding with a bootstrapping transaction identifier associated with said mobile terminal device.

18. The apparatus according to claim 17, further comprising:
a transmitter configured to transmit, in response to successful authentication, an acknowledgement message to indicate successful mobile internet protocol registration.

19. The apparatus according to claim 17, further comprising:
a receiver configured to receive a subsequent request message for mobile internet protocol registration; and
said registration authenticator is further configured to authenticate said subsequent request message by utilizing said obtained network application function specific key.

20. The apparatus according to claim 18, wherein
said transmitter is further configured to transmit a message indicating that bootstrapping is needed when a request message for mobile internet protocol registration is received at the home agent prior to performing said bootstrapping procedure.

21. A computer program embodied on a computer readable medium the computer program configured to control a process to perform:
performing a generic authentication architecture bootstrapping procedure between said mobile terminal device and said bootstrapping server function resulting in said mobile terminal device and said bootstrapping server function each acquiring at least a bootstrapping transaction identifier associated with said mobile terminal device and a corresponding shared key;

deriving with said mobile terminal device a network application function specific key based on at least said acquired shared key and an identifier of a network application function;

deriving with said mobile terminal device a message authentication code based on at least said derived network application function specific key;

sending from said mobile terminal device to said home agent a request message for mobile internet protocol registration comprising said derived message authentication code and an identifier of said mobile terminal device;

obtaining, based on said received identifier of said mobile terminal device, said network application function specific key with said home agent from one of said bootstrapping server function and said network application function; and authenticating said received request message for mobile internet protocol registration with said home agent by verifying said received message authentication code with said obtained network application function specific key.

22. A method, comprising:

performing a generic authentication architecture bootstrapping procedure with a bootstrapping server function of a packet data network resulting in a device and said bootstrapping server function each acquiring at least a bootstrapping transaction identifier associated with said device and a corresponding shared key;

deriving a network application function specific key based on at least said acquired shared key and an identifier of a network application function of said packet data network;

deriving a message authentication code based on at least said derived network application function specific key; and sending a request message for mobile internet protocol registration comprising said derived message authentication code and an identifier of said device.

23. The method according to claim 22, further comprising:

receiving an acknowledgement message to indicate successful mobile internet protocol registration.

24. The method according to claim 22, further comprising:

transmitting a subsequent request message for mobile internet protocol registration to be authenticated.

25. The method according to claim 22, wherein, if a request message for mobile internet protocol registration is transmitted from said device without performing said bootstrapping procedure first, a message is received to indicate that bootstrapping is needed.

26. A method, comprising:

obtaining, based on an identifier of a device of a packet data network, a network application function specific key from one of a bootstrapping server function of a packet data network and a network application function; said identifier of said device is received from said device; and authenticating a request message for mobile internet protocol registration by verifying a message authentication code with said obtained network application function specific key, said request message and said message authentication code received from said device, said received message authentication code having been derived based on another copy of said network application function specific key, and said another copy of said network application function specific key having been derived based on at least an identifier of said network application function and a shared key corresponding with a bootstrapping transaction identifier associated with said device.

27. The method according to claim 26, further comprising:

transmitting, in response to successful authentication, an acknowledgement message to indicate successful mobile internet protocol registration.

28. The method according to claim 27, further comprising:

receiving a subsequent request message for mobile internet protocol registration; and authenticating said subsequent request message by utilizing said obtained network application function specific key.

29. The method according to claim 27, wherein, if a request message for mobile internet protocol registration is received at said home agent prior to said bootstrapping procedure being performed, a message is transmitted to indicate that bootstrapping is needed.

* * * * *